(12) United States Patent
Beck et al.

(10) Patent No.: US 11,708,838 B2
(45) Date of Patent: Jul. 25, 2023

(54) CHEMICAL SEQUESTRATION OF WELLBORE FLUIDS IN ELECTRIC SUBMERSIBLE PUMP SYSTEMS

(71) Applicant: Halliburton Energy Services, Inc., Houston, TX (US)

(72) Inventors: David Christopher Beck, Broken Arrow, OK (US); Walter Dinkins, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 472 days.

(21) Appl. No.: 16/920,337

(22) Filed: Jul. 2, 2020

(65) Prior Publication Data
US 2022/0003240 A1 Jan. 6, 2022

(51) Int. Cl.
| F04D 29/08 | (2006.01) |
| F04D 13/10 | (2006.01) |
| E21B 43/12 | (2006.01) |
| F16J 15/18 | (2006.01) |
| F04D 13/08 | (2006.01) |
| F04D 7/04 | (2006.01) |

(52) U.S. Cl.
CPC .......... *F04D 29/086* (2013.01); *E21B 43/128* (2013.01); *F04D 13/086* (2013.01); *F16J 15/181* (2013.01); *F04D 7/04* (2013.01)

(58) Field of Classification Search
CPC .... E21B 43/128; F04D 29/086; F04D 13/086; F04D 7/04; F16J 15/181
See application file for complete search history.

(56) References Cited

U.S. PATENT DOCUMENTS

| 3,703,468 | A | 11/1972 | Chess et al. |
| 4,446,038 | A | 5/1984 | Schlicht et al. |
| 4,940,911 | A | 7/1990 | Wilson |
| 6,100,616 | A | 8/2000 | Heinig et al. |
| 7,198,723 | B2 | 4/2007 | Mcgarvey et al. |
| 7,367,400 | B1 * | 5/2008 | Howell ............. H02K 5/132 |
| | | | 166/66.4 |

(Continued)

FOREIGN PATENT DOCUMENTS

| CN | 1184195 | 1/2005 |
| CN | 102482591 | 5/2012 |

(Continued)

OTHER PUBLICATIONS

Application No. PCT/US2020/040783, International Search Report and Written Opinion, dated Mar. 18, 2021, 11 pages.
Kesslin et al., "Ortho Esters as Water Scavengers", I&EC Product Research and Development, vol. 5, No. 1, Mar. 1966, 3 pages.

*Primary Examiner* — Charles G Freay
(74) *Attorney, Agent, or Firm* — Kilpatrick Townsend & Stockton LLP

(57) ABSTRACT

An electric submersible pump includes a pump, an electric motor that is coupled to the pump by a rotatable shaft, a seal section that is positioned between the pump and the electric motor. The seal section contains an additive and a motor oil for the electric motor. The additive includes one or more superabsorbent polymers or imidate salts to contact the motor oil and to react with a wellbore fluid from a wellbore to prevent premature failure of the electric submersible pump from the wellbore fluid contamination of the motor oil.

20 Claims, 4 Drawing Sheets

(56) References Cited

U.S. PATENT DOCUMENTS

| | | | |
|---|---|---|---|
| 7,767,631 B2* | 8/2010 | Levy | C10M 111/04 508/156 |
| 7,980,233 B2 | 7/2011 | Wagner et al. | |
| 10,323,751 B2* | 6/2019 | Wang | F16L 51/022 |
| 10,428,630 B2 | 10/2019 | Bennett et al. | |
| 2004/0029748 A1 | 2/2004 | Levy | |
| 2004/0136849 A1 | 7/2004 | Du et al. | |
| 2005/0087343 A1 | 4/2005 | Du et al. | |
| 2007/0027245 A1 | 2/2007 | Vaidya et al. | |
| 2007/0051510 A1 | 3/2007 | Veneruso et al. | |
| 2010/0204066 A1 | 8/2010 | Ivan et al. | |
| 2014/0087977 A1 | 3/2014 | Kim et al. | |
| 2014/0154101 A1* | 6/2014 | Gerrard | E21B 43/128 417/53 |
| 2014/0190706 A1* | 7/2014 | Varkey | E21B 43/128 166/66.4 |
| 2015/0226220 A1* | 8/2015 | Bevington | F04D 13/086 417/372 |
| 2017/0015824 A1* | 1/2017 | Gozalo | C08L 33/18 |

FOREIGN PATENT DOCUMENTS

| | | |
|---|---|---|
| CN | 103459359 | 12/2013 |
| CN | 104302748 | 8/2017 |
| CN | 107956452 | 4/2018 |
| CN | 105189719 | 5/2018 |
| DE | 102010034758 | 2/2012 |
| EP | 0909872 | 4/1999 |
| ES | 2198490 | 2/2004 |
| JP | 2000239483 | 9/2000 |
| JP | 2002146376 | 5/2002 |
| JP | 2007039998 | 2/2007 |
| JP | 5739012 | 5/2015 |
| JP | 2018153765 | 10/2018 |
| KR | 19980033608 | 9/1998 |
| KR | 19980071961 | 10/1998 |
| KR | 20120102959 | 9/2012 |
| RO | 111107 | 6/1996 |
| RO | 119233 | 6/2004 |
| WO | 2008113021 | 9/2008 |
| WO | 2017096103 | 6/2017 |
| WO | 2017188834 | 11/2017 |

* cited by examiner

CHEMICAL SEQUESTRATION OF WELLBORE FLUIDS IN ELECTRIC SUBMERSIBLE PUMP SYSTEMS

TECHNICAL FIELD

The present disclosure relates generally to an electric submersible pump and, more particularly (although not necessarily exclusively), to managing contaminants in an electric submersible pump system for use in a wellbore.

BACKGROUND

In a hydrocarbon well, an electric submersible pump may be used to move wellbore fluid from downhole to the surface, such as by using artificial lift for hydrocarbon extraction. An electric submersible pump may be used to manage the pressure of the fluid or the flow of fluid extracted from the wellbore.

An electric submersible pump may contain one or more electric submersible motors, one or more seal sections, and one or more pumps, and can be positioned downhole in a wellbore. Electric submersible pumps in wellbore operations can be positioned at depths of at great depths and operate under extreme temperate and pressure conditions. The electric submersible motors may be filled with motor oil to provide a fluid film for bearing operation and provide dielectric resistance between the rotor and stator. Infiltration of contaminants, including wellbore fluids, into the electric submersible pump motor oil can degrade the lubricity and dielectric characteristics of the motor oil and can increase the likelihood of premature failure of the electric submersible pump due to an electrical fault. The effects of premature failure of an electric submersible pump include costly maintenance activities and lost production from the wellbore.

DETAILED DESCRIPTION

Figure 1:
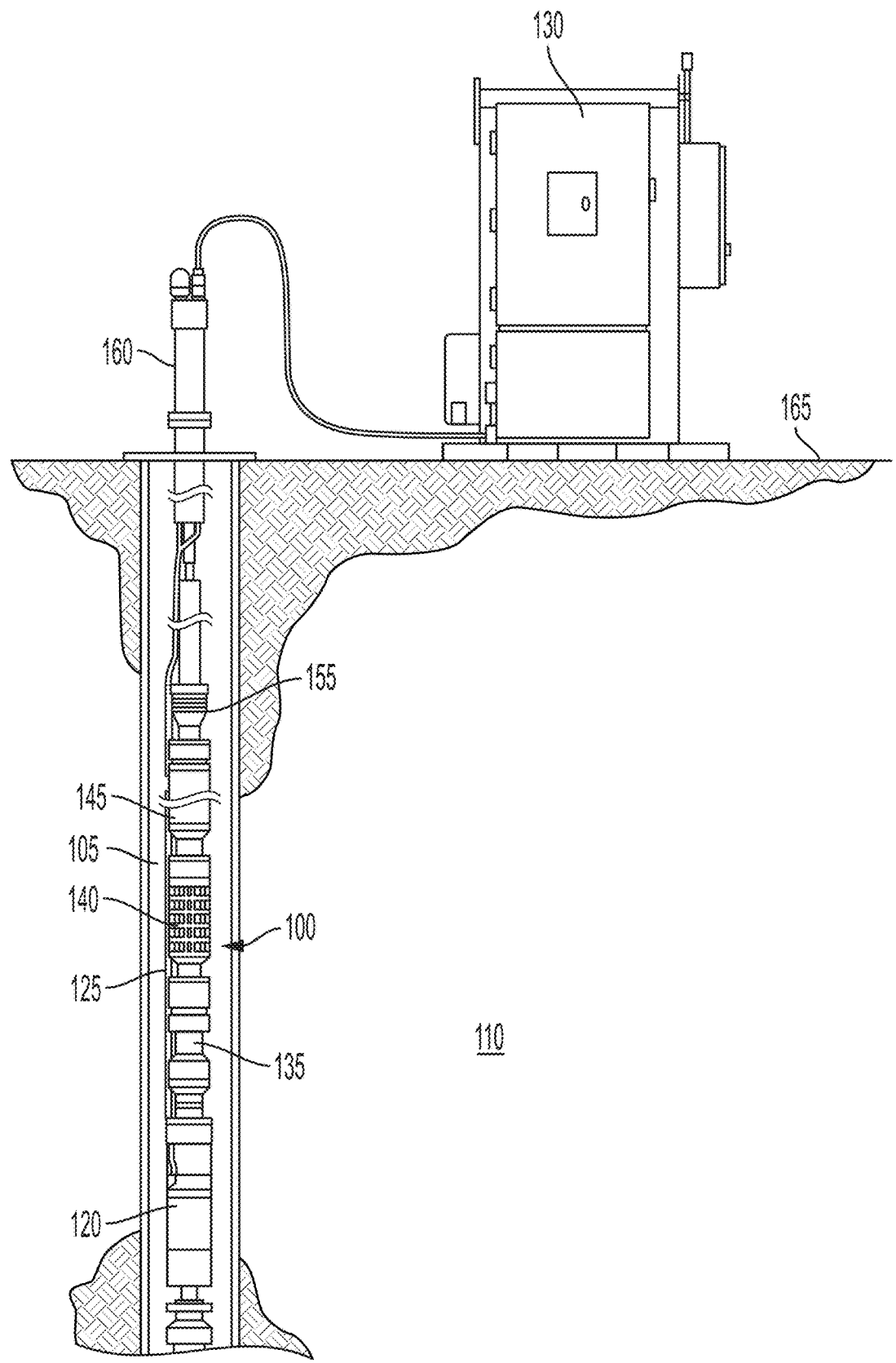
FIG. 1 is a schematic of a wellbore in which an electric submersible pump with a seal section is positioned to communicate with surface equipment according to one example of the present disclosure.

Certain aspects and examples of the present disclosure relate to additives that can be used in a seal section of an electric submersible pump to sequester contaminants, including wellbore fluids. The additives can include superabsorbent polymers or other chemicals to neutralize or bind wellbore fluids that infiltrate into a seal section, and to prevent the wellbore fluids from degrading the motor oil in the electric submersible pump. For example, additives can include superabsorbent polymers, an imidate salt, or mixtures thereof, that can react with wellbore fluids or otherwise bind wellbore fluids that leaked into the seal section so that the wellbore fluids are no longer available to react or otherwise alter the properties of the motor oil in the electric submersible pump.

Neutralizing the wellbore fluids to prevent the wellbore fluids from degrading the motor oil characteristics can prolong the operational life of the motor by preventing or delaying motor failure due to motor oil contamination. Postponing potential failures of the motor can increase the run-life of an electric submersible pump system downhole.

The additives can include one or more chemical compounds, comprising one or more imidate salts, one or more superabsorbent polymers, or a combination of both. The additives can react with wellbore fluids or otherwise bind wellbore fluids that leaked into the seal section of the pump, but not adversely affect the dielectric and lubricity characteristics of the motor oil. Wellbore fluids may include water and a myriad of other polar compounds. A polar compound can be a covalently bonded substance with an electric dipole moment caused by positive and negative charged ends of the compound. The petroleum-based motor oil may be nonpolar and nonreactive with the additives.

The sealing mechanisms of the pump systems can fail during downhole operation and allow wellbore fluid to infiltrate the sealing mechanisms. The mixing of water and other polar compounds in wellbore fluid with the motor oil in the electric motor and seal can alter the fluid properties of the motor oil, and can degrade the characteristics of the motor oil, such as lubricity and dielectric properties. The degradation can impact the operation of the fluid layer in the bearing system, cause instability in bearing forces, and increase the risk of electrical failure. These effects may be more pronounced when the wellbore fluid is predominantly composed of water.

When the additive is included in the seal section, degradation of the motor oil characteristics due to contamination from water or other polar compounds can be slowed or delayed. Including the additive in the seal section can postpone possible failures due to an imbalance of bearing forces or an electrical failure. Chemical neutralizing and binding wellbore fluids in the seal section can continue during operations until the additive becomes exhausted or reaches capacity with the wellbore fluids. The delay of the degradation of the motor oil may be determined by the concentration of additives in the motor oil and rate of wellbore fluid infiltration.

In some examples, the additive is an imidate salt. Imidate salts are salt compounds containing a carbon-nitrogen double bond, with the nitrogen atom attached either to a hydrogen atom or an organic group, and the carbon atom having two additional single bonds. The imidate salt can react with water or other polar compounds in the wellbore fluid to convert the water or other polar compounds into an ester compound. The properties of the resulting ester compound may be more chemically compatible with the motor oil and be less harmful to the electric submersible pump system than the unreacted water or polar compounds in the wellbore fluid. The lubricity, dielectric properties, and reactivity of the ester compounds may be more similar to the motor oil than the water or polar compounds in wellbore fluid. The chemical neutralization of the water or other polar compounds can minimize the impact to the dielectric and lubricity characteristics of the motor oil, postpone failures caused by wellbore fluid infiltration, and extend the run life of the pump.

In some examples, the additive is one or more superabsorbent polymers. The superabsorbent polymer can react with water or other polar compounds in the wellbore fluid to bind the water or other polar compound through hydrogen bonding. The superabsorbent polymer may sequester or bind water and other polar wellbore fluids, preventing contamination from reaching the motor and extending the run life of the pump.

In some examples, the motor oil in the seal sections of an electric submersible pump may be contained in chambers, surrounded by polymer bags for a positive barrier against wellbore fluid infiltration. The polymer bags can provide space for thermal expansion of the motor oil and serve as a barrier between the wellbore fluid and the electric motor. In some cases, a tear may develop in the bag downhole that can result in wellbore fluid entering through the breached bag into the chamber holding the motor oil. In other cases, wellbore fluid infiltration can occur through leaks in the pump housing or at the mechanical face seals around the pump shafts between seal sections. The additive can be added to the motor oil to neutralize or bind water or water-predominant wellbore fluid and postpone failures caused by wellbore fluid infiltration oil within a seal section.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a wellbore 105 in which an electric submersible pump 100, with a seal section 135 that includes an additive to neutralize or bind wellbore fluids, is positioned to communicate with surface equipment according to one example of the present disclosure. The wellbore 105 can be in a subterranean environment 110 and the electric submersible pump 100 may provide artificial lift to wellbore fluid by moving wellbore fluid from a position downhole to a surface 165 through a wellhead 160. Artificial lift can be employed during the production phase of a hydrocarbon well after subterranean pressures have abated and a free-flow stage of the well has ended. The electric submersible pump 100 in the wellbore 105 can provide artificial lift to maintain the production rate from the wellbore 105.

The electric submersible pump 100 can have an electric motor 120 coupled to a pump 145 by a shaft to provide mechanical power to the pump 145 from the electric motor 120. The pump 145 may have an intake 140 and a discharge 155. The intake 140 can allow the pump 145 to draw in wellbore fluid and direct the wellbore fluid toward the surface 165 through the discharge 155. The electric motor 120 may be electrically coupled to a variable speed controller 130 by a cable 125. The variable speed controller 130 can provide both power and control signals to the electric motor 120 through the cable 125. The variable speed controller 130 and the wellhead 160 may be positioned above the surface 165.

Between the pump 145 and the electric motor 120 is at least one seal section 135 that can contain at least one additive to neutralize or bind wellbore fluids inside the seal section 135. The seal section 135 can transfer torque to the pump 145 from the electric motor 120. The seal section 135 can prevent wellbore fluid from contaminating motor oil for the electric motor 120 through isolation, equalization, and expansion. The seal section 135 may also prevent pump-shaft thrust from impacting motor performance through force absorption. The seal section 135 can isolate the electric motor 120 from wellbore fluid that can otherwise cause electrical and mechanical faults of the electric motor 120.

Figure 2:
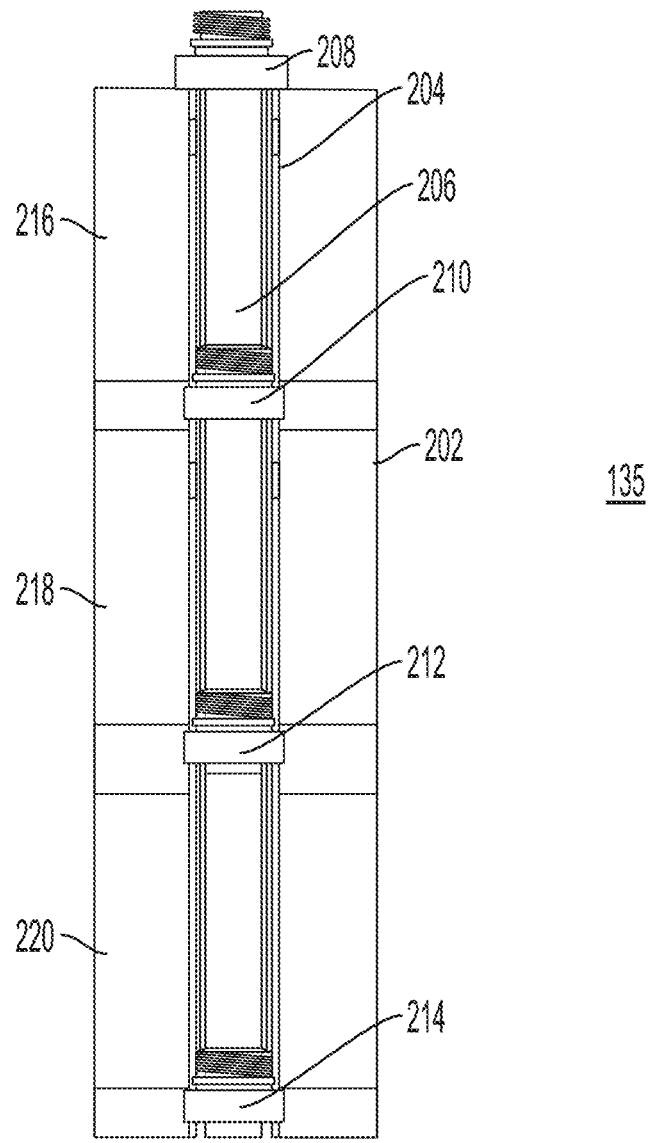
FIG. 2 is a partial cross-sectional schematic of a seal section that can be installed in an electric submersible pump and that contains fluid with additives to neutralize or bind wellbore fluids according to one example of the present disclosure.

FIG. 2 is a partial cross-sectional schematic of a seal section 135 that can be installed in an electric submersible pump and that includes seal bags 216-220, each with an additive to neutralize or bind wellbore fluids according to one example of the present disclosure. As depicted, the seal section 135 is depicted as having three sections defined between mechanical seals 208-214 and including seal bags 216-220. Each of the seal bags 216-220 is positioned within an outer housing 202.

The seal section 135 also includes a guide tube 204 in which is positioned a shaft 206. The shaft 206 can couple an electric motor to a pump of the electric submersible pump. The mechanical seals 208-214 can prevent fluid from entering the seal section 135 around the shaft 206 through the guide tube 204. The seal bags 216-220 can further isolate the electric motor and prevent ingress of wellbore fluid due to the failure of one of the mechanical seals 208-214.

In this example, the three sections in the seal section 135 may provide redundant protection for the electric motor 120. If one of the three sections fails, the electric motor can still function without contamination from wellbore fluid. For example, the seal bag in a section may develop a leak and the motor oil may be exposed to wellbore fluid. The additive may neutralize or bind water and other polar wellbore fluid contamination in response to the breach of the bag. The additive can neutralize or bind the wellbore fluid and prevent contamination from reaching the motor.

The additives may normally be in a non-reacting and non-absorbing state when contacting motor oil that is substantially free of polar compounds from wellbore fluid. The additives can be available to remove wellbore fluid contaminants continuously from the motor oil of the electric submersible pump. The additives may be resilient to the high temperature and pressure conditions of downhole operations.

Figure 3:
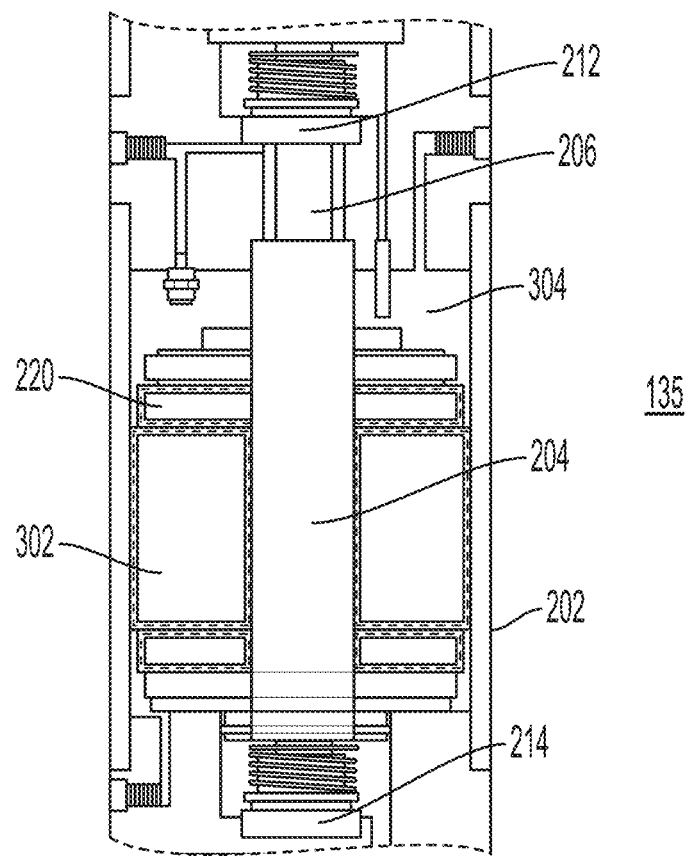
FIG. 3 is a cross-sectional schematic of a seal section that includes a seal bag for containing fluid with additives to neutralize or bind wellbore fluids according to one example of the present disclosure

FIG. 3 is a cross-sectional schematic of a seal section 135 that includes a seal bag 220 with additives to neutralize or bind wellbore fluids according to one example of the present disclosure. The seal section 135 can have an outer housing 202 that can be a pipe that may be bounded at each end by a head and a base. Check valves within the head and base can allow motor oil to move within the seal section 135 to maintain a constant and slightly positive pressure through the seal section 135 relative to the wellbore pressure at the pump intake.

The seal bag 220 can be positioned inside the outer housing 202 in the seal section 135 between mechanical face seals 212, 214. A guide tube 204 can be positioned axially within the seal section 135 and can define a cavity in which a shaft 206 can rotate to transfer power from the electric motor to the pump of an electric submersible pump.

Motor oil with additives to neutralize or bind wellbore fluids can fill an interior volume 302 of the seal bag 220 and the external volume 304 that is inside the outer housing 202. If the mechanical face seal 212 fails, the seal section 135 between the mechanical face seals 212 and 214 can be contaminated with wellbore fluid. In this example, the additives can protect the motor from contaminated motor oil by absorbing the wellbore fluid in seal section 135.

In some examples, the addition of one or more imidate salts into the motor oil can chemically combine with water or other water-predominant compounds wellbore fluid and form esters, thereby sequestering water into a less harmful chemical form with less impact or disruption to the dielectric properties and lubricity of the motor oil. The sequestration or neutralization of the water can preserve the integrity of the motor oil until the imidate salts are consumed in reaction.

Imidate salts can be used to convert alcohols and carboxylic acids to their respective ethers and esters. For example, imidate salts can combine with water molecules in a rapid and complete reaction by 1:1 hydrolysis. The hydrolysis reaction is provided in Equation 1.

$$RC(NH_2Cl)OC_2H_5 + H_2O \rightarrow RCOOC_2H_6 + NH_4C \qquad \text{Eq. 1}$$

This reaction can proceed rapidly, catalyzed or uncatalyzed, with most imidate salts at downhole temperatures and pressures. The water molecule can be hydrolyzed to produce an ester and an amide. In some examples, the ester and amide may subsequently convert into other compounds depending on motor oil additives and wellbore fluid chemistry.

The imidate salts may vary in carbon chain configuration and terminal groups. Examples of imidate salts include methyl 2,2,2-trichloroacetimidate, ethyl formimidate hydrochloride, methyl 2-chloroacetimidate hydrochloride, isopropyl formimidate hydrochloride, tert-Butyl 2,2,2-trichloroacetimidate, dimethyl adipimidate dihydrochloride, ethyl 2,2,2-trichloroacetimidate, methyl acetimidate hydrochloride, ethyl acetimidate hydrochloride, o-allyl 2,2,2-trichloroacetimidate, ethyl butyrimidate hydrochloride, diethyl malonimidate dihydrochloride, methyl benzim idate hydrochloride, benzyl 2,2,2-trichloroacetimidate, ethyl benzimidate hydrochloride, ethyl N-phenylformimidate, ethyl 4-hydroxybenzimidate hydrochloride, benzyl thioacetimidate hydrochloride, ethyl N-(2,4-dinitrophenoxy)acetimidate, dimethyl suberimidate dihydrochloride, and diphenyl N-cyanocarbonimidate. The imidate salt may be selected for stability at downhole conditions, miscibility with motor oil, rate and yield of reaction, reaction product characteristics, and impact on oil properties of reactant and product when in solution or suspension. An acceptable set of imidate salt reactants will maintain stability at downhole conditions, not negatively impact oil properties, and will convert to esters that maintain good compatibility with the motor oil.

In some examples, the imidate salt may have limited stability in downhole conditions. In such examples, the imidate may be generated in situ in the seal section of the electric submersible pump system. An imidate precursor that is more stable at downhole conditions and a water-activated catalyst can be added to the motor oil. The catalyst may be an acid catalyst, such as HCl. In some examples, the catalyst may be a base. Upon activation of the catalyst, the synthesis reaction can generate the imidate salt, from which the hydrolysis reaction can then proceed rapidly and preferentially. The in situ generation may proceed using a Pinner type, Hoesch type, or other reaction mechanism as appropriate to conditions within the motor oil. The Pinner type reaction is shown in Equation 2.

$$RCN + R'OH + HCl \rightarrow RC(NH_2Cl)OR' \qquad \text{Eq. 2}$$

The reaction of the imidate salt to produce an ester may be irreversible and desirable to consume water in a system. In some examples, the imidate salt can react with the wellbore fluid to produce an orthoester. The orthoester may be compatible with the motor oil. In some examples, the orthoester can continue to react within the seal system. In particular, the orthoester can irreversibly react with water in the wellbore fluid. In some examples, the orthoester can effectively scavenge water from the system. Examples of orthoesters include methyl orthoformate and ethyl orthoformate.

The additive, e.g., the imidate precursor or imidate salt, and the wellbore fluids may be present in the seal section and in an unreactive state until water or other polar wellbore fluid contaminant enters the seal section. Upon contact with water or other polar wellbore fluid contaminant that breaches the seal section, the additive can react with the water or other polar wellbore fluid contaminant. The reaction can be irreversible and prevent the water or other polar wellbore fluid contaminant from degrading the motor oil properties by chemically removing the contaminant.

In some examples, the addition of one or more superabsorbent polymers into the motor oil, either in a solution or a suspension, can bind a water-predominant wellbore fluid to the superabsorbent polymer, rendering it less harmful, until the polymer is saturated. In response to contact with the water or other polar substance, superabsorbent polymers can absorb polar and other aqueous compounds through hydrogen bonding. The degree of crosslinking within the superabsorbent polymer can change the total absorbency and swelling capacity of the superabsorbent polymer. Low-density, cross-linked superabsorbent polymers may have a higher absorbent capacity and increased swell volume. High cross-link density polymers may have a lower absorbent capacity and reduced swell volume. High cross-link density polymers can be more rigid than low cross-link density polymers and may maintain the particle shape of the high cross-link density polymers, even under modest pressure.

One or more superabsorbent polymers may be suspended in the motor oil contained in the motor section and seal section. In some examples, the superabsorbent polymers may not include cross-linkers. The superabsorbent polymers may be hydrophilic or lipophilic. In some examples, superabsorbent polymers may be selected based on affinity to the polar compounds expected to be found in the wellbore fluid and to minimize the impact of the polar compounds on motor oil properties.

Superabsorbent polymers may be acrylic-acid based. Sodium polyacrylate, a poly-acrylic acid sodium salt, is a superabsorbent polymer that may be employed in the additive. Other superabsorbent polymers for use in the additive may be based on polyacrylamide copolymer, ethylene maleic anhydride copolymer, cross-linked carboxymethylcellulose, polyvinyl alcohol copolymers, cross-linked polyethylene oxide, or a starch-grafted copolymer of polyacrylonitrile.

An additive that includes superabsorbent polymers can absorb many times its weight in water or other polar fluid before becoming saturated and no longer be able to actively absorb and sequester a wellbore fluid contaminant. The superabsorbent polymer in the additive may be in the form of a powder, granules, pellets, beads, gel, or fluid. The superabsorbent polymers may be in solution or in suspension with the oil. Some superabsorbent polymers can quickly absorb up to 100, 200, 300, 500, 700, or 1000 times their weight in water.

The additive can be included in the seal section in amounts to avoid restricting the flow of motor oil within the seal section or to avoid reducing the availability of the motor oil in the seal section for operations of the pump.

In some examples, the additive may include an organic drying agent. The drying agent can react with water to remove water from the system and convert it to a more compatible compound. Examples of an organic drying agent include 2,2-dimethoxypropane, ethylene glycol, and cellulose.

In some examples, the additives may include a mixture of imidate salts and superabsorbent polymers, which may work in parallel to react, absorb, or otherwise scavenge water and other polar compounds in wellbore fluids that breach the seal section. The additives can delay, and in some cases substantially prevent, degradation of the motor oil and damage to the electric motor. In some examples, the imidate salts may be selected to convert water molecules and the superabsorbent polymer may be selected to absorb water molecules and other polar compounds of wellbore fluids. In certain examples, the superabsorbent polymer selected may be selected to absorb the products of the imidate hydrolysis. In some examples, the additives may include a mixture of imidate salts, superabsorbent polymers, and an organic drying agent. The additives may include a mixture of imidate salts and organic drying agents. The additives may include a mixture of superabsorbent polymers and organic drying agents.

Figure 4:
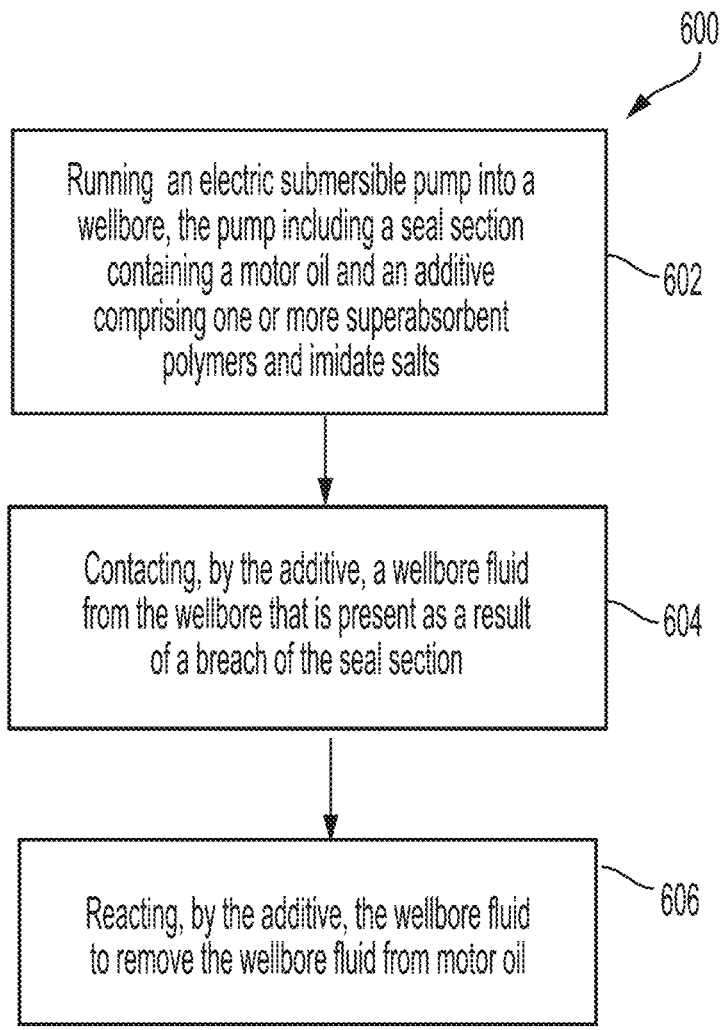
FIG. 4 is a flowchart of a process for absorbing or neutralizing a wellbore fluid contaminant by additives according to one example of the present disclosure.

FIG. 4 is a flowchart of a process 600 for neutralizing a wellbore fluid contaminant in seal section according to one example of the present disclosure. In block 602, an electric submersible pump is run downhole into a wellbore. The electric submersible pump can be run downhole using a conveyance mechanism such as coiled tubing or wireline. The electric submersible pump can include an electric motor and a pump coupled together by a shaft that transmits power from the electric motor to the pump. The electric motor can power the pump so that the pump provides artificial lift for the wellbore. One or more seal sections can be positioned between the electric motor and the pump. The seal section can include a seal bag that has an additive to neutralize or bind wellbore fluids. The additive may include a superabsorbent polymer, an imidate salt, organic drying agents, or mixtures thereof. The seal sections can isolate the electric motor from wellbore fluids.

In block 604, the additive contacts water or other polar wellbore fluid contaminate that may enter the motor oil due to a leak in the system. The additive may be one or more superabsorbent polymers, imidate salts, or organic drying agents. The leak may be at the rotatable mechanical face seal at the connection of each seal section, from the housing of seal section, or from a bag within the seal section.

In block 606, the additive, e.g., one or more superabsorbent polymers, imidate salts, or organic drying agents react with the water or other polar wellbore fluid contaminate to absorb or neutralize the contaminate and prevent it from reaching the electric motor. During operation of the electric submersible pump, the additive can continually absorb or neutralize water or other polar wellbore fluid contaminants that infiltrate the motor oil in the seal section until the additive is substantially consumed or saturated by the wellbore fluid.

In some aspects, electric submersible pumps, seals, and methods for removing water or other polar wellbore fluids are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is an electric submersible pump, comprising: a pump, an electric motor that is coupled to the pump by a rotatable shaft, a seal section positioned between the pump and the electric motor for containing a motor oil for the electric motor, and an additive comprising one or more superabsorbent polymers or one or more imidate salts positioned in the seal section to contact the motor oil and to react with a wellbore fluid from a wellbore.

Example 2 is the electric submersible pump of example(s) 1, wherein the wellbore fluid is a polar compound and reactive with the additive.

Example 3 is the electric submersible pump of example(s) 1-2, wherein the additive is nonreactive with motor oil.

Example 4 is the electric submersible pump of example(s) 1-3, wherein the seal section comprises an outer housing and a seal bag internal to the outer housing, and wherein the additive is positioned within the seal bag.

Example 5 is the electric submersible pump of example(s) 1-4, wherein the one or more superabsorbent polymers are an acrylic-acid polymer, a polyacrylamide copolymer, an ethylene maleic anhydride copolymer, a cross-linked carboxymethylcellulose, a polyvinyl alcohol copolymer, a cross-linked polyethylene oxide, or a starch-grafted copolymer of polyacrylonitrile.

Example 6 is the electric submersible pump of example(s) 1-5, wherein the one or more superabsorbent polymers have an absorbency with the wellbore fluid in an amount of up to 1000 times greater than a weight of the one or more superabsorbent polymers.

Example 7 is the electric submersible pump of example(s) 1-6, wherein the one or more superabsorbent polymers are in a form of a powder, granules, pellets, or beads and is suspended in the seal section.

Example 8 is the electric submersible pump of example(s) 1-7, wherein one or more the imidate salts comprise methyl 2,2,2-trichloroacetimidate, ethyl formimidate hydrochloride, methyl 2-chloroacetimidate hydrochloride, isopropyl formimidate hydrochloride, tert-Butyl 2,2,2-trichloroacetimidate, dimethyl adipimidate dihydrochloride, ethyl 2,2,2-trichloroacetimidate, methyl acetimidate hydrochloride, ethyl acetimidate hydrochloride, o-allyl 2,2,2-trichloroacetimidate, ethyl butyrimidate hydrochloride, diethyl malonimidate dihydrochloride, methyl benzimidate hydrochloride, benzyl 2,2,2-trichloroacetimidate, ethyl benzimidate hydrochloride, ethyl N-phenylformimidate, ethyl 4-hydroxybenzimidate hydrochloride, benzyl thioacetimidate hydrochloride, ethyl N-(2,4-dinitrophenoxy)acetimidate, dimethyl suberimidate dihydrochloride, or diphenyl N-cyanocarbonimidate.

Example 9 is the electric submersible pump of example(s) 1-8, wherein an imidate precursor is positioned in the seal section to generate the one or more imidate salts in situ in the seal section.

Example 10 is the electric submersible pump of example(s) 1-9, wherein the additive is in an unreactive state until contacted by the wellbore fluid.

Example 11 is the electric submersible pump of example(s) 1-10, wherein the additive further comprises an organic drying agent to react with the wellbore fluid.

Example 12 is a seal comprising: an outer housing positionable between a pump and an electric motor of an electric submersible pump; a seal bag internal to the outer housing; and an additive internal to the seal bag, the additive including one or more superabsorbent polymers or one or more imidate salts to contact a motor oil in the seal bag and to react with a wellbore fluid in the seal as a result of a breach in the seal.

Example 13 is the seal of example(s) 12, wherein the wellbore fluid is water or other polar compound and is reactive with the additive.

Example 14 is the seal of example(s) 12-13, wherein the additive is in an unreactive state until contacted by the wellbore fluid.

Example 15 is the seal of example(s) 12-14, wherein the additive is stable at downhole temperatures and pressures.

Example 16 is the seal of example(s) 12-15, wherein an imidate precursor is positioned in the seal to generate the one or more imidate salts in situ in the seal.

Example 17 is a method comprising: positioning an electric submersible pump into a wellbore, the electric submersible pump including a pump, an electric motor coupled to the pump, a seal section, an additive in the seal section, and a motor oil in the seal section, the additive including a superabsorbent polymer or imidate salt; contacting, by the additive, a wellbore fluid in the motor oil, the wellbore fluid present as a result of a breach of the seal section; and reacting, by the additive, the wellbore fluid to remove the wellbore fluid from the motor oil.

Example 18 is the method of example(s) 17, wherein the superabsorbent polymer is a solution or in a suspension in the motor oil.

Example 19 is the method of example(s) 17-18, wherein the wellbore fluid is a polar compound.

Example 20 is the method of example(s) 17-19, wherein the additive is in an unreactive state until contacting the wellbore fluid.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An electric submersible pump, comprising:
   a pump;
   an electric motor that is coupled to the pump by a rotatable shaft;
   a seal section positioned between the pump and the electric motor for containing a motor oil for the electric motor; and
   an additive comprising one or more imidate salts or one or more imidate precursors positioned in the seal section to contact the motor oil and to react with a wellbore fluid from a wellbore.

2. The electric submersible pump of claim 1, wherein the wellbore fluid is a polar compound and reactive with the additive.

3. The electric submersible pump of claim 1, wherein the additive is nonreactive with motor oil.

4. The electric submersible pump of claim 1, wherein the seal section comprises an outer housing and a seal bag internal to the outer housing, and wherein the additive is positioned within the seal bag.

5. The electric submersible pump of claim 1, wherein the additive further comprises one or more superabsorbent polymers, and wherein the one or more superabsorbent polymers are an acrylic-acid polymer, a polyacrylamide copolymer, an ethylene maleic anhydride copolymer, a cross-linked carboxymethylcellulose, a polyvinyl alcohol copolymer, a cross-linked polyethylene oxide, or a starch-grafted copolymer of polyacrylonitrile.

6. The electric submersible pump of claim 1, wherein the additive further comprises one or more superabsorbent polymers, and wherein the one or more superabsorbent polymers have an absorbency with the wellbore fluid in an amount of up to 1000 times greater than a weight of the one or more superabsorbent polymers.

7. The electric submersible pump of claim 1, wherein the additive further comprises one or more superabsorbent polymers, and wherein the one or more superabsorbent polymers are in a form of a powder, granules, pellets, or beads and is suspended in the seal section.

8. The electric submersible pump of claim 1, wherein one or more the imidate salts comprise methyl 2,2,2-trichloroacetimidate, ethyl formimidate hydrochloride, methyl 2-chloroacetimidate hydrochloride, isopropyl formimidate hydrochloride, tert-Butyl 2,2,2-trichloroacetimidate, dimethyl adipimidate dihydrochloride, ethyl 2,2,2-trichloroacetimidate, methyl acetimidate hydrochloride, ethyl acetimidate hydrochloride, o-allyl 2,2,2-trichloroacetimidate, ethyl butyrimidate hydrochloride, diethyl malonimidate dihydrochloride, methyl benzimidate hydrochloride, benzyl 2,2,2-trichloroacetimidate, ethyl benzimidate hydrochloride, ethyl N-phenylformimidate, ethyl 4-hydroxybenzimidate hydrochloride, benzyl thioacetimidate hydrochloride, ethyl N-(2,4-dinitrophenoxy)acetimidate, dimethyl suberimidate dihydrochloride, or diphenyl N-cyanocarbonimidate.

9. The electric submersible pump of claim 1, wherein the one or more imidate precursors generate the one or more imidate salts in situ in the seal section.

10. The electric submersible pump of claim 1, wherein the additive is in an unreactive state until contacted by the wellbore fluid.

11. The electric submersible pump of claim 1, wherein the additive further comprises an organic drying agent to react with the wellbore fluid.

12. A seal comprising:
    an outer housing positionable between a pump and an electric motor of an electric submersible pump;
    a seal bag internal to the outer housing; and
    an additive internal to the seal bag, the additive including one or more imidate salts or one or more imidate precursors to contact a motor oil in the seal bag and to react with a wellbore fluid in the seal as a result of a breach in the seal.

13. The seal of claim 12, wherein the wellbore fluid is water or other polar compound and is reactive with the additive.

14. The seal of claim 12, wherein the additive is in an unreactive state until contacted by the wellbore fluid.

15. The seal of claim 12, wherein the additive is stable at downhole temperatures and pressures.

16. The seal of claim 12, wherein the one or more imidate precursors generate the one or more imidate salts in situ in the seal.

17. A method comprising:
    positioning an electric submersible pump into a wellbore, the electric submersible pump including a pump, an electric motor coupled to the pump, a seal section, an additive in the seal section, and a motor oil in the seal section, the additive including one or more imidate salts or one or more imidate precursors;
    contacting, by the additive, a wellbore fluid in the motor oil, the wellbore fluid present as a result of a breach of the seal section; and
    reacting, by the additive, the wellbore fluid to remove the wellbore fluid from the motor oil.

18. The method of claim 17, wherein the additive further comprises a superabsorbent polymer, and wherein the superabsorbent polymer is a solution or in a suspension in the motor oil.

19. The method of claim 17, wherein the wellbore fluid is a polar compound.

20. The method of claim 17, wherein the additive is in an unreactive state until contacting the wellbore fluid.

* * * * *